Jan. 1, 1957

R. STEINITZ 2,775,809

BRAZING OF MOLYBDENUM AND TUNGSTEN AND
BRAZED STRUCTURES PRODUCED THEREBY

Filed May 13, 1952

INVENTOR.
ROBERT STEINITZ

BY

ATTORNEYS

United States Patent Office 2,775,809
Patented Jan. 1, 1957

2,775,809

BRAZING OF MOLYBDENUM AND TUNGSTEN AND BRAZED STRUCTURES PRODUCED THEREBY

Robert Steinitz, New York, N. Y., assignor, by mesne assignments, to Borolite Corporation, Pittsburgh, Pa., a corporation of Delaware Application May 13, 1952, Serial No. 287,497

5 Claims. (Cl. 29—198)

This invention relates to a novel process of brazing a molybdenum or tungsten part to another high-melting metal part such as molybdenum, tungsten or tantalum and to brazed structures produced thereby.

In the manufacture of vacuum tubes or the like it is frequently desirable to unite a molybdenum part to another molybdenum part or to a tungsten part to give a composite product which will retain its strength at high temperatures, such as in the range of 1500° to 1800° C. However, in the past, there was not available a satisfactory method for brazing molybdenum or tungsten parts to each other.

Among the objects of this invention is to provide a process of uniting two such parts by brazing. It is also among the objects of the invention to provide such composite brazed product which will operate at elevated temperatures in the range up to about 1800° C. without loss of strength at the brazing junction.

The foregoing and other objects of the invention will be best understood from the following description of exemplifications of the same when read in connection with the accompanying drawing.

Figure 1:
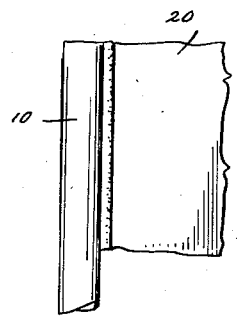
Fig. 1 is a side view, partly cut away, of a plate and supporting rod brazed together by the process of the invention.

In order to produce a strong brazing joint between two body parts of molybdenum or tungsten for use in applications, such as vacuum tubes, it is essential to provide a brazing material which would melt not too high above the maximum working temperature, and which should readily wet molybdenum and/or tungsten and not form any low melting phases with it. Furthermore, no gases should be released at high temperature either by decomposition or by any reaction with the residual gas in the vacuum tube or in the environment in which such brazed product is to be used. Powdered nickel, platinum and similar metals have been found unsatisfactory for such a process.

In the brazing process a brazing compositon which has a fairly constant and predetermined melting point is desirable. The melting point of the brazing compound should be somewhat less than the melting point of the metal parts to be brazed and yet should not be so low as to permit separation of the parts in the normal use of the product to wit, at temperatures between about 1500 to 1800° C. The brazing compound must wet the surface of the parts to be united.

The present invention is based on the discovery that a molybdenum boride composition having a boron content in the critical range of 3 to 7% and generally corresponding to the formula $Mo_2B$ is very effective in providing a strong brazing joint between two parts of either molybdenum, tungsten. (Unless otherwise stated, all proportions are given herein by weight.)

There are three borides of molybdenum having melting points between about 2000 and 2200° C. It should be understood that throughout the specification and claims the temperatures mentioned have an accuracy of ±50° C. only. However, the lowest boride, $Mo_2B$, has great advantages over the other two because of its small boron content, and the fact that it starts to melt at about 2000° C. and is completely liquid at about 2060° C., and remains in a liquid state at such temperature at the contacting areas of the joint parts even if the $Mo_2B$ loses some of its boron by diffusion into the joined parts while it is maintained at such high temperature during the brazing operation.

If the braze is applied to molybdenum metal, the boron diffuses into the molybdenum thereby lowering the boron content of the braze material. If a higher boride is employed, the melting point changes constantly, going up when MoB is formed, and down again later with the further depletion of boron. This is extremely unfavorable because the braze does not stay liquid and forms lumps during the process. The $Mo_2B$ or composition close to it, is very much superior for brazing. $Mo_2B$ starts to melt at 2000° C. and is completely liquid at about 2060° C. In the region between these two temperatures, the material is in a mushy state which is very favorable for brazing. During the diffusion of boron into the molybdenum pieces to be brazed, the point at which melting starts remains constant so that the material stays liquid if the temperature is not lowered.

The range of boron in a molybdenum boron composition, at which such a favorable behavior is met extends from 3 to 7% boron. For compositions above 7% the starting point for melting is 70° higher, and at least at high temperatures, an undesirable intermediary compound is formed. In the range from 3 to 7% boron $Mo_2B$ is formed with either an excess of molybdenum if the composition is below 5.3% boron, or with some slight excess of MoB which during diffusion readily changes into $Mo_2B$.

The molybdenum boride of the desired critical boron content may be made in any desired way, as by heating an intimate mixture of the powdered molybdenum and boron in the proper proportions at a temperature of around 2000° C. and then reducing the resultant boride to a powder. A very convenient method of applying the brazing compound to the parts is to first make a slurry of the proper boride powder with water, alcohol or similar volatile liquid and apply the slurry to one or both of the parts to be united.

Figure 2:
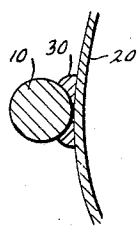
Fig. 2 is a cross-section of the same device along line 2—2 of Fig. 1.
Figure 3:
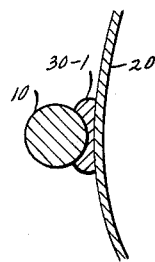
Fig. 3 is a view similar to Fig. 2, of somewhat modified brazed junction between the same parts.

In a typical application of the invention illustrated in Figs. 1–3, a plate or anode 20 of sheet metal, such as molybdenum or tungsten is united to a supporting rod 10 of similar material by the brazing material 30 of the invention. In the brazing process there is a certain amount of diffusion of the boride into the metal parts 10 and 20. This diffusion of the brazing compound 30 of the invention into the parts 10 and 20 makes a stronger bond. In the modified form of brazing junction shown in Fig. 3, a thin layer of the brazing material 30 of the junction is also shown interposed between the rod 10 and the plate 20 which are joined to each other by the brazing junction.

Figure 4:
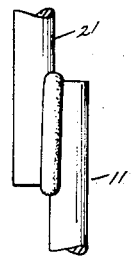
Fig. 4 is a side view showing two rods united by the process of the invention.
Figure 5:
Fig. 5 is a cross-sectional view along line 5—5 of Fig. 4.

Figs. 4 and 5 show two rods 11 and 21 united by brazing material 30. In the figures shown one or both of the pieces 10 and 20 or 11 and 21 may be molybdenum or tungsten and one of the pieces 10 and 20 or 11 or 21 may be tantalum. The characteristic of these metals which makes them applicable to the present invention is that the said metals all melt above the melting point of the braze and the molybdenum boride is capable of wetting the clean surface of these metals and readily forms a solution with these metals.

The following examples further illustrate the process of the invention:

Example 1

Molybdenum boride containing 5.3% of boron is reduced to a fine powder and mixed with water to form a slurry. The slurry is brushed onto the area of rod 10 which is to be united to the plate 20. The parts are clamped together and heated while protected against access of oxygen. To this end, the heating is carried on either in vacuum or with a protective atmosphere such as hydrogen, cracked ammonia, or like protective or inert gases. The braze produced is very clean in appearance since any oxides formed are evaporated before the brazing temperature is reached.

Example 2

The process is conducted as in Example 1 except that a molybdenum boride containing 6.5% of boron is employed. Also instead of heating the parts in vacuum or within a hydrogen atmosphere, the parts may be quickly heated by means of a hydrogen torch which keeps the air and oxygen out of the heated zones. In this way an effect similar to spot welding may be obtained.

As seen from the examples, the invention solves the problem of uniting high melting point metal parts by brazing in a very effective and desirable way. The process is especially applicable in the manufacture of vacuum tubes especially since molybdenum has the property of forming tight seals with glass.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

I claim:

1. In a process of brazing a part consisting essentially of a metal selected from the class consisting of molybdenum and tungsten to a part consisting essentially of a metal selected from the class consisting of molybdenum, tungsten and tantalum, the procedure comprising applying to areas of the metal parts to be united by brazing a powder of molybdenum boride corresponding to $Mo_2B$ and containing 3–7% boron by weight, holding the parts together and heating the contacting areas to be united and the powder applied thereto to a temperature between about 1900 to 2100° C. in the absence of an oxidizing medium at which temperature said powder melts and wets the heated metal parts.

2. In a process of brazing a part consisting essentially of a metal selected from the class consisting of molybdenum and tungsten to a part consisting essentially of a metal selected from the class consisting of molybdenum, tungsten and tantalum, the procedure comprising applying to areas of the metal parts to be united by brazing a powder of molybdenum boride corresponding to $Mo_2B$ and containing 3–7% boron by weight, holding the parts together and heating the contacting areas to be united and the powder applied thereto to a temperature between about 1900 to 2100° C. in a non-oxidizing atmosphere at which temperature said powder melts and wets the heated metal parts.

3. In a process of brazing a part consisting essentially of a metal selected from the class consisting of molybdenum and tungsten to a part consisting essentially of a metal selected from the class consisting of molybdenum, tungsten and tantalum, the procedure comprising applying to areas of the metal parts to be united by brazing a powder of molybdenum boride corresponding to $Mo_2B$ and containing 3–7% boron by weight, holding the parts together and heating the contacting areas to be united and the powder applied thereto to a temperature between about 1900 to 2100° C. in a vacuum at which temperature said powder melts and wets the heated metal parts.

4. A composite article comprising a first metal part selected from the class consisting of molybdenum and tantalum, and a second metal part selected from the class consisting of molybdenum, tungsten and tantalum, said parts being united by a braze of molybdenum boride corresponding to $Mo_2B$ and containing 3–7% boron by weight, which braze and metal portions joined by said braze were heated to a temperature between about 1900° to 2100° C. at which the composition of said braze was molten and had wetted said joined metal portions, said parts remaining united and being capable of withstanding temperatures of up to about 1800° C. without parting.

5. A composite article comprising a first metal part consisting essentially of molybdenum and a second metal part consisting essentially of molybdenum, said parts being united by a braze of molybdenum boride corresponding to $Mo_2B$ and containing 3–7% boron by weight, which braze and metal portions joined by said braze were heated to a temperature between about 1900° to 2100° C. at which the composition of said braze was molten and had wetted said joined metal portions, said parts remaining united and being capable of withstanding temperatures of up to about 1800° C. without parting.

References Cited in the file of this patent

UNITED STATES PATENTS

| | | |
|---|---|---|
| 2,330,062 | Lempert | Sept. 21, 1943 |
| 2,404,157 | Ahalt | July 16, 1946 |
| 2,671,958 | Block | Mar. 16, 1954 |

FOREIGN PATENTS

| | | |
|---|---|---|
| 487,263 | Great Britain | June 17, 1938 |
| 625,195 | Great Britain | June 23, 1949 |

OTHER REFERENCES

Melin Abstract of application Serial Number 560,163, published Sept. 25, 1951; 650 O. G. 1195.